United States Patent [19]
Moll

[11] Patent Number: 4,699,016
[45] Date of Patent: Oct. 13, 1987

[54] TRANSLATABLE DRIVE APPARATUS

[75] Inventor: Robert E. Moll, Fairfield, Conn.

[73] Assignee: Pitney Bowes Inc., Stamford, Conn.

[21] Appl. No.: 825,297

[22] Filed: Feb. 3, 1986

[51] Int. Cl.⁴ .............................................. F16H 1/14
[52] U.S. Cl. ....................................... 74/417; 74/396;
74/406; 198/457; 271/314
[58] Field of Search ........................ 198/457; 226/182;
74/417, 395, 396, 406, 665 GB, 665 GE, 665 P;
271/238, 272, 314

[56] References Cited
U.S. PATENT DOCUMENTS

| Re. 13,336 | 12/1911 | Henderson | 271/314 X |
|---|---|---|---|
| 408,801 | 8/1889 | Giles | 74/417 |
| 3,059,753 | 10/1962 | Lisinski | 198/411 |
| 4,015,447 | 4/1977 | Philip | 226/182 X |
| 4,437,560 | 3/1984 | Wolf | 198/457 |
| 4,469,242 | 9/1984 | Costa | 74/417 X |
| 4,591,046 | 5/1986 | Toste, Jr. et al. | 198/457 |

Primary Examiner—Leslie Braun
Assistant Examiner—Dwight G. Diehl
Attorney, Agent, or Firm—Lawrence E. Sklar; Melvin J. Scolnick; David E. Pitchenik

[57] ABSTRACT

A drive apparatus having a drive shaft, at least one driven element fixedly secured to the drive shaft for rotation therewith, and at least one driven shaft operatively connected to the drive shaft. The driven shaft is oriented perpendicular to the drive shaft and is translatable along a portion of the length of the drive shaft. The drive apparatus also includes a device for continuously rotating the drive shaft, whereby the driven element and the driven shaft are continuously rotated.

3 Claims, 2 Drawing Figures

TRANSLATABLE DRIVE APPARATUS

BACKGROUND OF THE INVENTION

The instant invention relates to drive apparatus and more particularly to a drive apparatus having a drive shaft and a plurality of outputs therefrom, and wherein at least one of the outputs consists of a driven shaft oriented perpendicular to the drive shaft and being adjustable along the length of the drive shaft.

There are many applications in which a drive shaft is used for power take-off for a plurality of driven gears and shafts. Spur gears and bevel gears are commonly used to provide multiple power take-offs from a single drive shaft to other shafts or pulleys or gears. In many of these applications, it is frequently desirable to be able to translate a driven shaft oriented perpendicular to the drive shaft along the length of the drive shaft without interfering with any of the other driven gears, pulleys or shafts. Such an application is presented by an envelope turner in which it is desirable to be able to position the turning device according to the size of the envelope being turned. The instant invention therefore provides a flexible drive apparatus which allows at least one driven shaft oriented perpendicular to the drive shaft to be translated along the length of the drive shaft without interference with any of the other driven portions of the drive apparatus.

SUMMARY OF THE INVENTION

Accordingly, the instant invention provides a drive apparatus having a drive shaft, at least one driven element fixedly secured to the drive shaft for rotation therewith, and at least one driven shaft operatively connected to the drive shaft. The driven shaft is oriented perpendicular to the drive shaft and is translatable along a portion of the length of the drive shaft. The drive apparatus also includes a device for continuously rotating the drive shaft, whereby the driven element and the driven shaft are continuously rotated.

DETAILED DESCRIPTION OF THE PREFERRED EMBODIMENT

Figure 1:
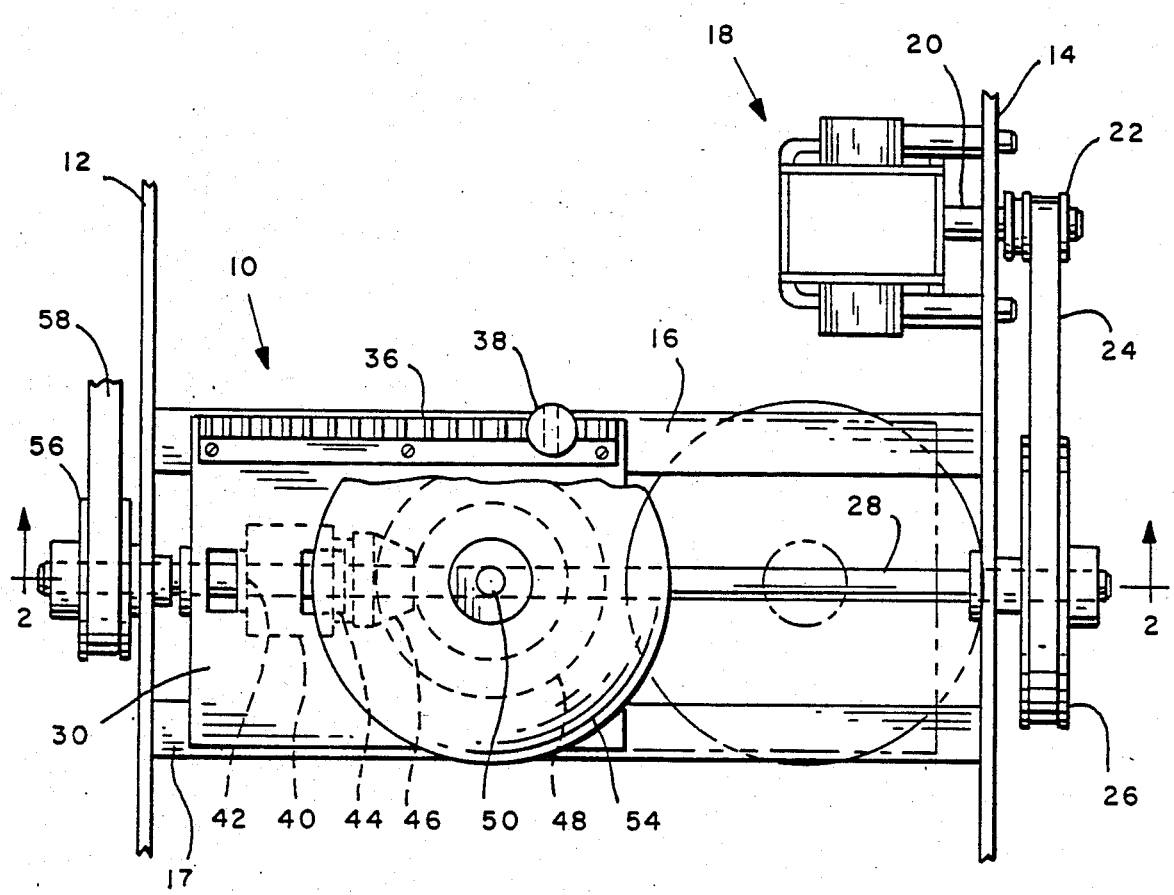
FIG. 1 is a top, plan view of a drive apparatus in accordance with the instant invention.

In describing the preferred embodiment of the instant invention, reference is made to the drawings, wherein there is seen an envelope turning device generally designated 10 having housing sidewalls 12 and 14 joined by a pair of bracket guides 16 and 17. A motor 18 is secured to the sidewall 14, and includes a drive shaft 20 having at one end thereof a first toothed pulley 22. A toothed belt 24 engages and is driven by the pulley 22 and in turn drivingly engages a second, larger toothed pulley 26. A drive shaft 28 is journalled in the two sidewalls 12 and 14 and has fixedly mounted at one end thereof the second, toothed pulley 26. The drive shaft 28 is situated between the bracket guides 16 and 17 as best seen in FIG. 1. A platform 30 has apertures 32 and 34 (see FIG. 2) for sliding engagement with the drive shaft 28. Secured to the platform 30 at one side thereof is a rack 36 which engages a detentable tooth 38 secured to the housing of the envelope turner 10. A one-way clutch 40 is mounted for sliding engagement on the drive shaft 28, and a pair of flanges 42 and 44 (see FIG. 2) extending downwardly from the platform 30 connect the one-way clutch 40 to the platform 30 so that translation of the platform 30 effects translation of the one-way clutch 40. Mounted on the drive shaft 28 and operatively connected to the one-way clutch 40 is a first bevel gear 46. A driven shaft 50 is journalled in a cylindrical housing 51 and is fixedly secured to the second bevel gear 48 at one end thereof, while at the other end of the shaft 50 a rotatable disc 52 and a rotatable cone 54 are secured thereto. The disc 52 and cone 54 include means for clamping an envelope therebetween and turning the envelope at the appropriate time for the appropriate distance, none of which is shown. Fixedly mounted at the other end of the drive shaft 28 is an output pulley 56 which engages a transfer belt 58.

In operation, the motor 18, when energized, rotates the drive shaft 20 continuously which in turn rotates the first toothed pulley 22 continuously. The toothed belt 24 transmits the rotation of the pulley 22 to the second toothed pulley 26 which in turn transmits the rotation to the drive shaft 28. The output pulley 56, being fixedly mounted to the drive shaft 28, is rotated by the drive shaft 28 and causes the transfer belt 58 to rotate. The one-way clutch 40 transmits the rotation of the drive shaft 28 to the first bevel gear 46 and the second bevel gear 48, which causes the driven shaft 50 to rotate the rotatable disc 52 and the rotatable cone 54 at the end thereof. The disc 52 and cone 54 cooperate to turn envelopes (not shown) fed therebetween, which envelopes are then removed from the envelope turning device 10 by belts or rollers driven by the transfer belt 58.

Figure 2:
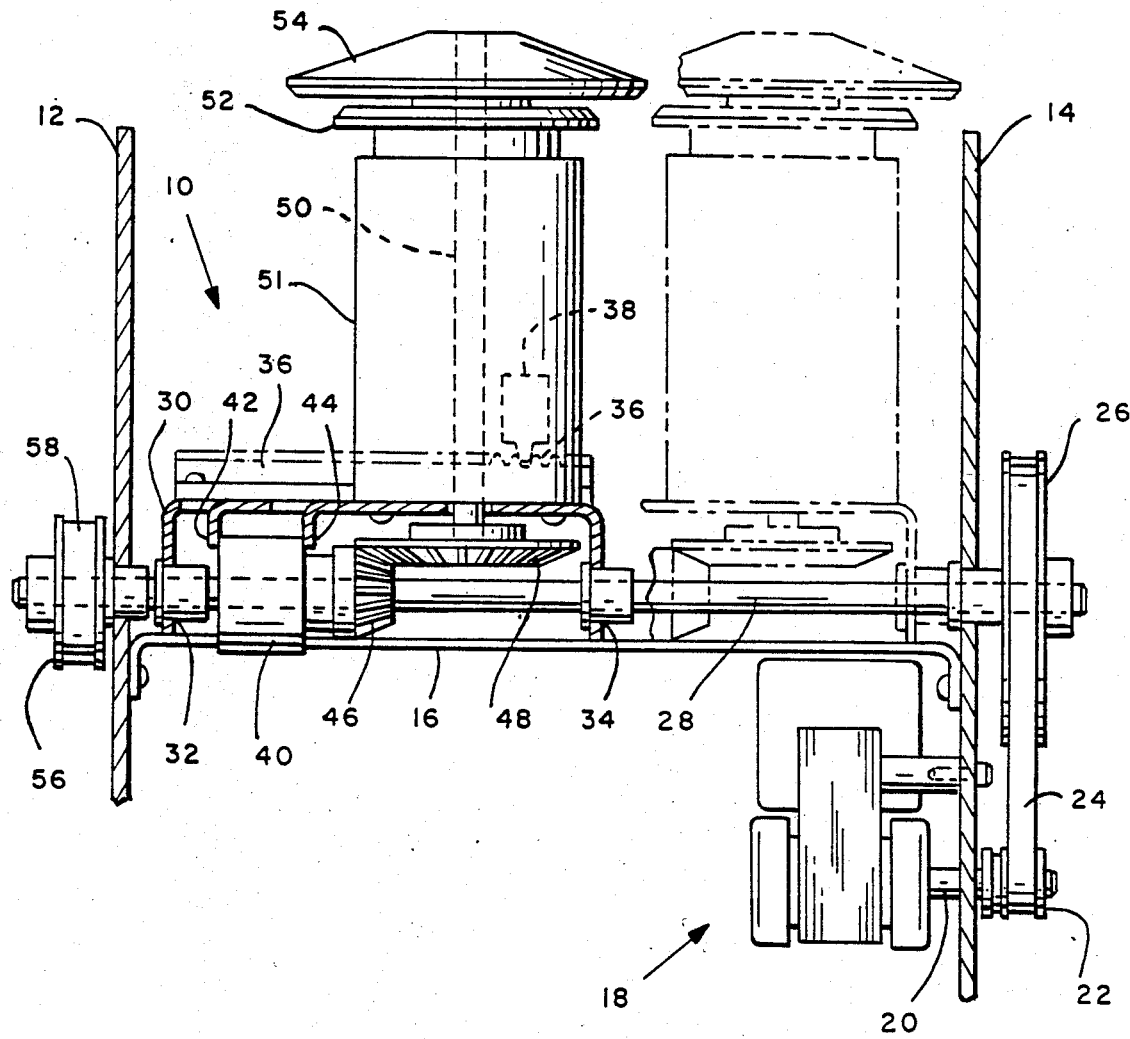
FIG. 2 is a sectional view taken on the plane indicated by the line 2—2 in FIG. 1.

The disc 52 and cone 54 can be translated left or right between the two positions shown in FIG. 2 depending upon the size of the envelope being turned because the one-way clutch 40 can slide on the drive shaft 28. Translation of the disc 52 and cone 54 is effected by the operator simply moving the platform 30 to the left or right which results in movement of the tooth 38 along the rack 36. The one-way clutch 40 permits translation of the platform 30 and transmits rotation to the disc 52 and cone 54 without the need for any additional drive elements.

It can be clearly seen that use of the one-way clutch 40 and the bevel gears 46 and 48 permits continuous rotation to be imparted to the output pulley 56 and to the disc 52 and cone 54. A preferred embodiment of the one-way clutch 40 utilizes conventional rollers to effect the clutching of the bevel gear 46 and the sliding of the clutch 40 along the drive shaft 28.

Obviously, the detentable tooth 38 can be replaced by other mechanical means, such as a pinion, which would be useful not only in moving the platform 30 but fixing the position of the platform 30 as well.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. A drive apparatus, comprising:
   a drive shaft;
   at least one driven element fixedly secured to said drive shaft for rotation therewith;

at least one driven shaft operatively connected to said drive shaft, said driven shaft being oriented perpendicular to said drive shaft and translatable along a portion of the length of said drive shaft;

a one-way clutch mounted on the drive shaft;

a first bevel gear mounted on the drive shaft and engaging said one-way clutch;

a second bevel gear engaging said first bevel gear and drivingly engaging said driven shaft; and means for continuously rotating said drive shaft, whereby said driven element and said driven shaft are continuously rotated.

2. The drive apparatus of claim 1, wherein said driven element comprises a pulley.

3. The drive apparatus of claim 1, additionally comprising a platform slidingly engaging said drive shaft and operatively connected to and translatable with said driven shaft.

* * * * *